United States Patent [19]

Beatty

[11] Patent Number: 4,984,978
[45] Date of Patent: Jan. 15, 1991

[54] DIVIDER HEAD ASSEMBLY

[75] Inventor: David E. Beatty, Wrenshall, Minn.

[73] Assignee: Dutchess Bakers' Machinery Co. Inc., Superior, Wis.

[21] Appl. No.: 472,580

[22] Filed: Jan. 30, 1990

Related U.S. Application Data

[63] Continuation-in-part of Ser. No. 217,657, Jul. 12, 1988, Pat. No. 4,898,528, and a continuation-in-part of Ser. No. 346,565, May 1, 1989, Pat. No. 4,950,147.

[51] Int. Cl.⁵ ............................ A21C 3/10; A21C 5/08
[52] U.S. Cl. ...................................... 425/185; 425/186; 425/297; 425/298; 425/332
[58] Field of Search ................ 425/332, 185, 186, 189, 425/297, 298, 292, 295, 300, 181, 182, 296, 192 R

[56] References Cited

U.S. PATENT DOCUMENTS

| | | | |
|---|---|---|---|
| 687,088 | 11/1901 | Van Houten | 425/300 |
| 1,177,835 | 4/1916 | Van Houten, Jr. | 425/300 |
| 1,352,424 | 9/1920 | Abrams et al. | 425/300 |
| 1,761,399 | 6/1930 | Kremmling | 425/300 |
| 1,864,401 | 6/1932 | Bernlohr | 425/300 |
| 2,094,289 | 9/1937 | Blum et al. | 425/332 |

FOREIGN PATENT DOCUMENTS 225131 12/1962 Austria ............................... 425/332

Primary Examiner—Jeffery Thurlow
Assistant Examiner—Mathieu Vargot
Attorney, Agent, or Firm—Paul L. Sjoquist

[57] ABSTRACT

A divider head assembly for attachment to a dividing and rounding machine, the divider head assembly incorporating a cover plate and attached plug plate, both of which have a central aperture therethrough. A cutter blade holder has a neck which slidably projects through the apertures, and a cutter blade holder is attachable to a cutter blade subassembly by means of fasteners. Access holes through the cover plate and plug plate permit access to the fasteners which attach the cutter blade holder to the cutter blade subassembly. The cutter blade subassembly is formed of a geometric arrangement of blades, the blades being welded together to form a unitary geometric arrangement.

6 Claims, 3 Drawing Sheets

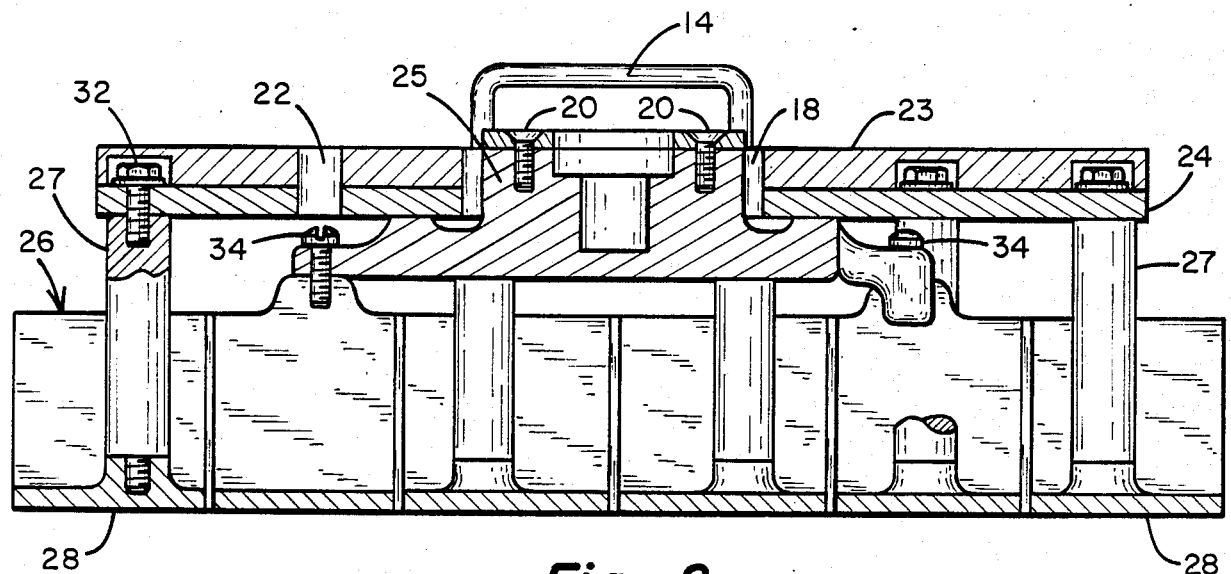
Fig. 2
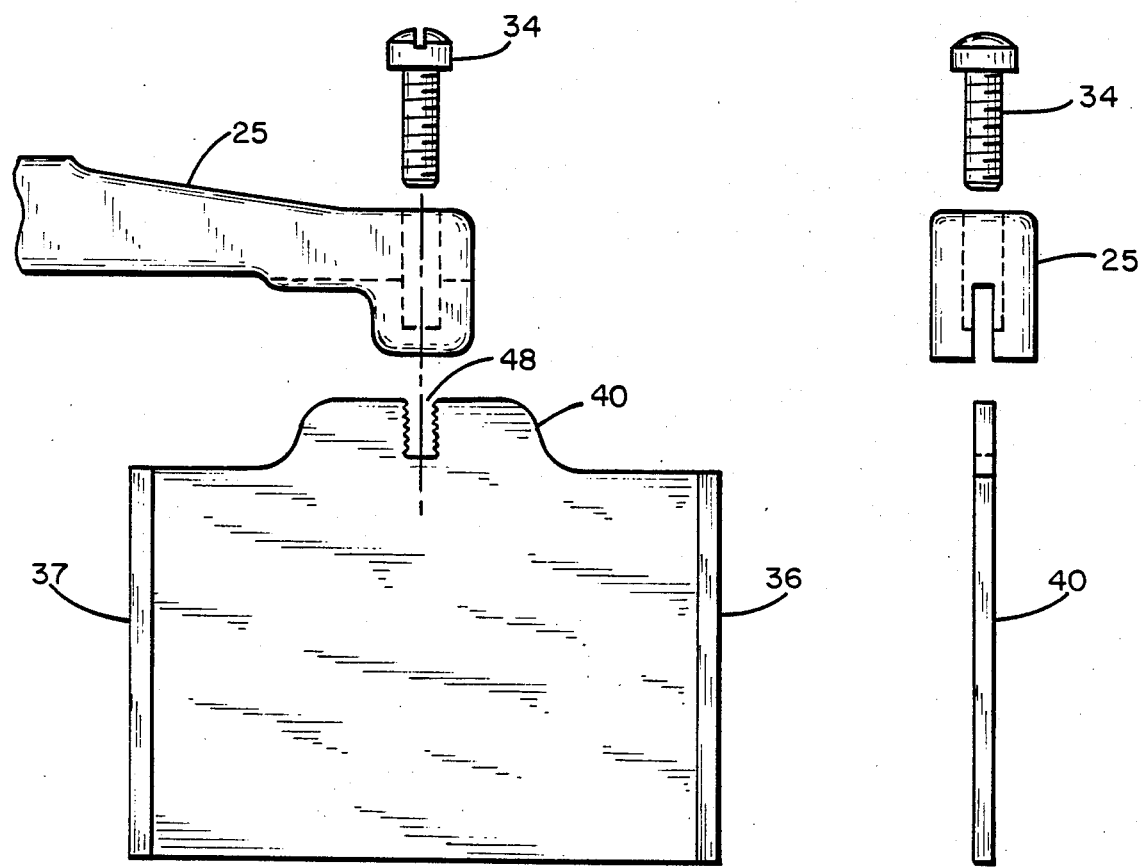
Fig. 5A
Fig. 5B

DIVIDER HEAD ASSEMBLY

BACKGROUND OF THE INVENTION

This is a continuation-in-part of U.S. patent application Ser. No. 217,657, filed July 12, 1988, now U.S. Pat. No. 4,896,528, and U.S. patent application Ser. No. 346,565, filed May 1, 1989, now U.S. Pat. No. 4,950,147, of which are owned by the assignee of the present invention.

The foregoing patent applications disclose dividing and rounding machines, which incorporate a divider head assembly which is generally of the type disclosed herein. The present invention represents an improvement in divider head assembly construction, which improvement may be utilized in the machines of the foregoing disclosure, and the prior patent applications are incorporated by reference herein.

The present invention relates to machines for handling and processing materials such as bread dough, cookie dough, and other similar food products for human consumption. The invention is also usable in related fields wherein materials of a consistency similar to dough are used, particularly in connection with a process wherein materials must be subdivided from bulk quantities.

Examples of dough-dividing machines which are disclosed in the earlier prior art may be found with reference to U.S. Pat. No. 1,177,835, issued April 14, 1916; U.S. Pat. No. 1,764,586, issued June 17, 1930; and U.S. Pat. No. 2,158,594, issued May 16, 1939. The general structure and operation disclosed in these prior art patents is still found in use today in machines of generally similar design.

Dough-dividing machines of the prior art, and particularly the divider head assemblies utilized in such machines, suffer from disadvantages relating to the ease of disassembly for purposes of cleaning the machine and its component parts. A typical and common problem with prior art machines is that partial disassembly of the machine for purposes of removing the divider assembly for cleaning is either impossible or extremely difficult, with the result that cleaning of divider head assemblies on prior art machines is usually accomplished while the divider head assembly is mounted on the machine. The machines wherein the divider head assembly may be removed for cleaning, the head assembly itself contains many uneven surfaces and recesses, the cleaning of which is very difficult, and it is therefore not uncommon for dough residue to remain on parts of the divider head assembly for long periods of time. This creates an unhealthy and unsafe environment which promotes the growth of bacteria.

The present invention is an improvement over the prior art divider head assemblies, primarily in its ability to be readily removed from the dividing and rounding machine, and also in its ability to be easily and further disassembled for cleaning. The component construction of the present invention enables a thorough cleaning of all component surfaces, because the existence of irregular surfaces and recesses has been minimized or eliminated.

SUMMARY OF THE INVENTION

An advantage of the present invention is that it provides a readily removable divider head assembly for easy cleaning and maintenance of the assembly.

Another advantage of the present invention is that it provides a divider head assembly which may be further disassembled for cleaning so as to permit thorough cleaning of all component parts.

The invention comprises a divider head assembly incorporating a cutter blade subassembly which is entirely formed of a single welded construction, and which is removable from the remainder of the divider head assembly by the release of four fasteners. The divider head assembly further comprises a plurality of plugs which are slidably fitted into the geometric arrangement between cutter blade sections, and are attached to a plug plate; the plug plate is attached to a cover plate, and the removable fasteners of the cutter blades are accessible through both plates. The cutter blade subassembly is fastened to a cutter blade holder and the cutter blade/cutter holder assembly may be movably actuated independently of the remainder of the divider head assembly.

It is the principal object of the present invention to provide a divider head assembly having an easily removable cutter blade subassembly, which is made from a one-piece construction.

It is a further object of the present invention to provide a cutter blade subassembly which may be easily removed from a divider head assembly for cleaning.

BRIEF DESCRIPTION OF THE DRAWINGS

The foregoing and other objects and advantages of the present invention will become apparent from the following specification and claims, and with reference to the appended drawings, in which:

FIG. 2 shows a cross-section view taken along the lines 2—2 of FIG. 1;

FIG. 5A shows an expanded view of one feature of the invention; and

FIG. 5B shows an end view of the same feature of the invention.

DESCRIPTION OF THE PREFERRED EMBODIMENT

Figure 1:
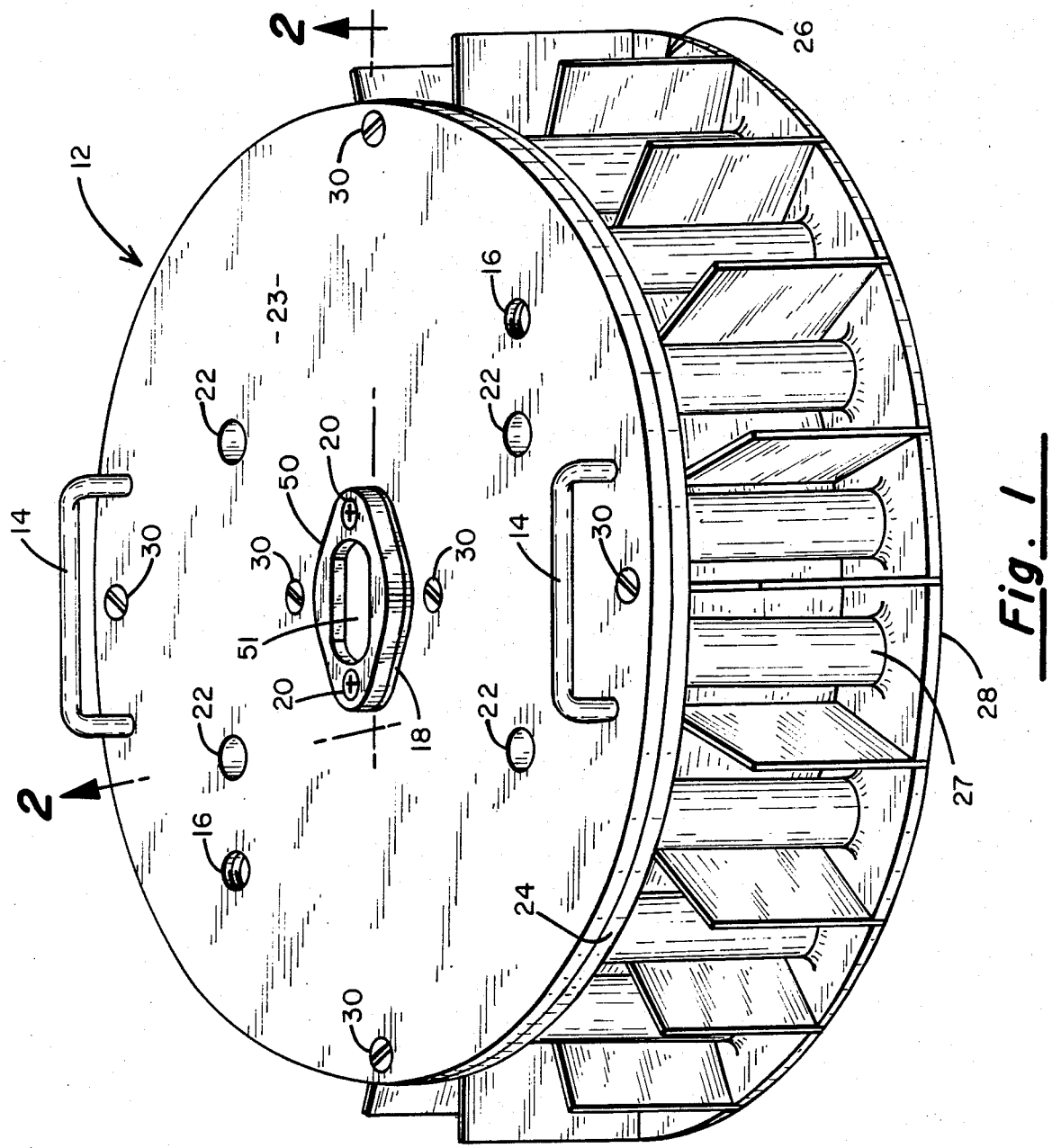
FIG. 1 shows an isometric view of the divider head assembly.

Referring first to FIG. 1, there is shown an isometric view of a divider head assembly 12 incorporating the features of the present invention. Divider head assembly 12 comprises a cover plate 23 which is affixed to a plug plate 24 by means of six fasteners 30. A pair of handles 14 are affixed to cover plate 23, to facilitate lifting of the divider head assembly 12. A pair of threaded holes 16 are provided in cover plate 23, for attachment to a trip plate (not shown) of the type described in U.S. patent application Ser. No. 346,565, filed May 1, 1989, now U.S. Pat. No. 4,950,147. An enlarged opening 18 is formed through cover plate 23 and plug plate 24, and a keyed collar 50 projects upwardly through enlarged opening 18. Keyed collar 50 is affixed to a cutter holder 25 (see FIG. 2) by means of fasteners 20. Keyed collar 50 has a key opening 51 which is shaped to receive a cross key of the type disclosed in the foregoing patent application. This cross key is formed at the bottom of a drive rack section which is a part of the machine to which divider head assembly 12 is operably attached.

Figure 4:
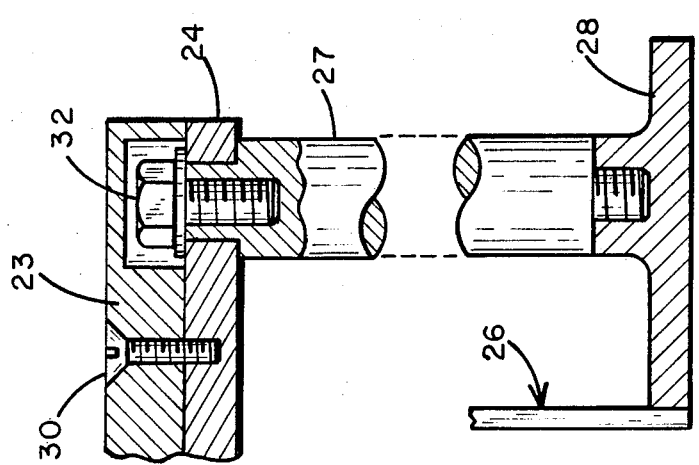
FIG. 4 shows a cross-sectional view of a portion of the assembly.

Cutter blade subassembly 26 is attached to cutter holder 25 by four fasteners to be hereinafter described. Each of the four fasteners is accessible through an access opening 22, which is formed through cover plate 23 and plug plate 24. A plurality of plugs 28 are each affixed to one of a plurality of stems 27, and all of the stems 27 are affixed to plug plate 24. FIG. 4 shows a cross-sectional view of one such connection, wherein the lower end of a stem 27 is threadably secured to a plug 28, and the upper end of stem 27 is affixed to plug plate 24 by means of a fastener 32. Each of the fasteners 32 are confined within a recess in the lower surface of cover plate 23, so that cover plate 23 may be tightly affixed against plug plate 24 by fasteners 30.

Referring next to FIG. 2, a cross-sectional view of divider head assembly 12 is shown, taken along the lines 2—2 of FIG. 1. Cutter holder 25 has an upwardly projecting neck which passes into enlarged opening 18 of cover plate 23 and plug plate 24. Cutter holder 25 is affixed to cutter blade subassembly 26 by means of four fasteners 34, two of which are shown in FIG. 2. Access to each of the fasteners 34 may be had from above via access openings 22. It is to be emphasized there is no direct connection between cutter holder 25 and either the cover plate 23 or the plug plate 24, and there is therefore the possibility of relative movement therebetween.

Figure 3:
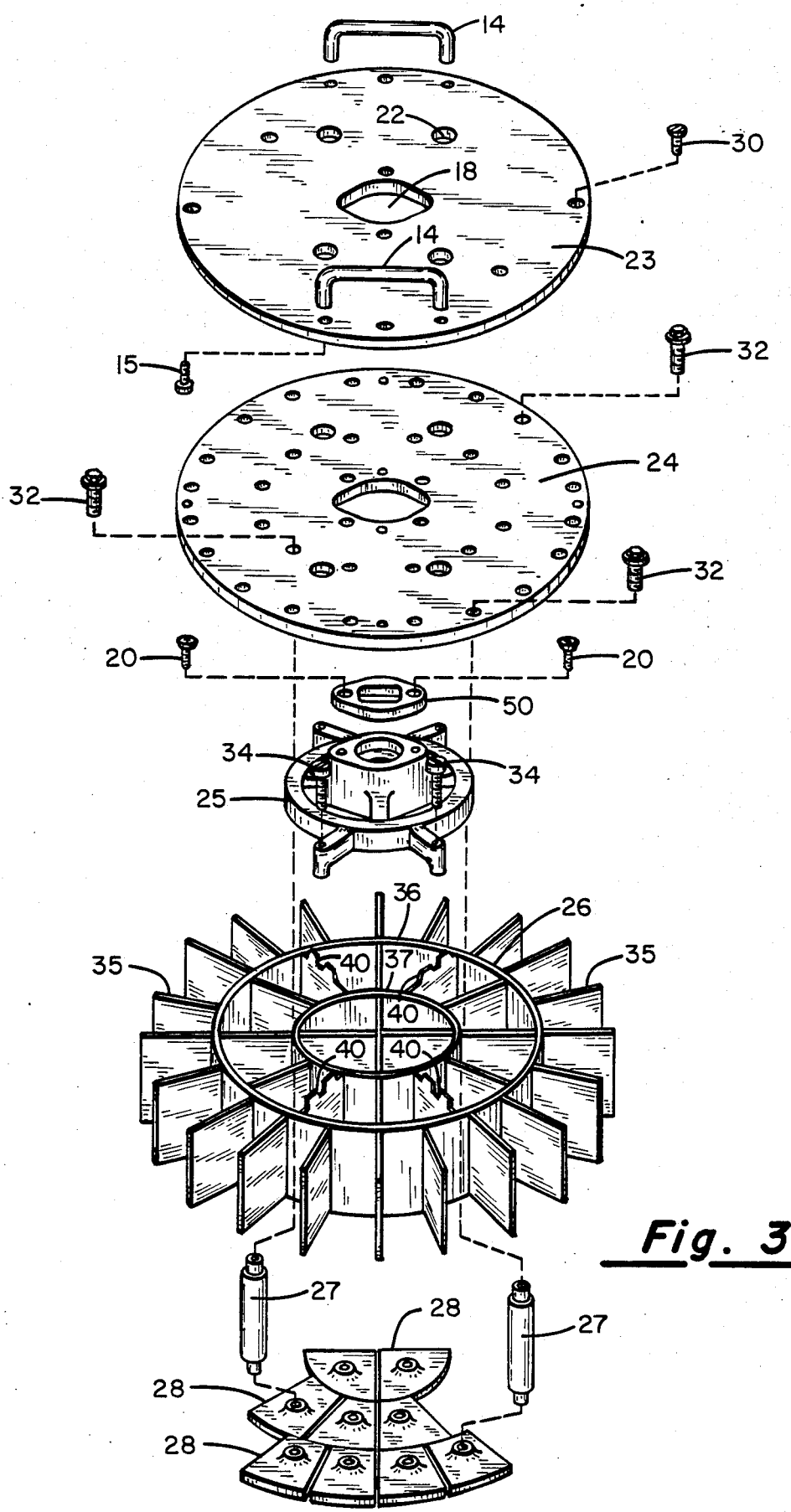
FIG. 3 shows an exploded isometric view of the divider head assembly.

FIG. 3 shows an exploded view of divider head assembly 12, illustrating the relative assembly of the respective components along a common axis. Handles 14 are secured via fasteners 15 which are threadably inserted through the underside of cover plate 23. Cover plate 23 is secured to plug plate 24 by means of fasteners 30. Plug plate 24 is attached to the plurality of stems 27 by means of fasteners 32, and plugs 28 are threadably attached to the lower ends of the respective stems 27. Plugs 28 are sized to slidably fit between the various blades which comprise cutter blade subassembly 26. Cutter blade subassembly 26 is threadably attached to cutter holder 25 by means of four fasteners 34, in a manner which will be described in more detail hereinafter. Keyed collar 50 is secured to the projecting neck of cutter holder 25 by means of fasteners 20.

Cutter blade subassembly 26 is preferably formed of a single, unitary construction of individual blades 35 arranged in a geometric configuration. This construction is preferably achieved as by welding, so that each of the plurality of blades 35 are welded in radial alignment outwardly from at least one of the blade cylinders 36, 37, which themselves form cutting blades. Four of the blades 40 project upwardly to a height above the remaining blades and blade cylinders. Each of the upwardly projecting blades 40 is attached to cutter holder 25 in a manner illustrated in FIGS. 5A and 5B. The upwardly projecting portion of each blade 40 has a threaded slot 48 formed therein. Threaded slot 48 is sized to be engageable by a fastener 34, which is secured through an opening in cutter holder 25.

In constructing the cutter blade subassembly 26, it is preferable to utilize a jig or fixture to pre-position each of the individual blade segments and blade cylinder segments in a relative position as shown in FIG. 3. Abutting edges of the respective blade segments are then welded to adjacent contact surfaces, along the entire contacting edges. After the completion of the welding process the cutter blades of subassembly 26 form a single unitary subassembly, with weldments along every contact line, so as to leave no cracks or openings between any two abutting blade segments. This construction technique enables cutter blade subassembly 26 to form a rigid subassembly, with no hidden openings or cracks within which foreign matter might be accumulated. Cleaning of cutter blade subassembly 26 can thereby be accomplished by a simple washing procedure, and the resulting construction will conform and comply with existing health regulations as to cleanliness.

In operation, the divider head assembly of the present invention may be constructed in a manner as has been described herein, and the entire divider head assembly may be mounted to a dividing and rounding machine of the type described in the copending applications identified herein. The features of the invention enable it to be operatively engaged in a dividing and rounding machine, and to be readily removed for cleaning and/or replacement. When the divider head assembly itself is to be disassembled for cleaning, it is only necessary to remove four fasteners to disengage the cutter blade subassembly from the remaining portions of the divider head assembly. Once disassembled, each of the subassemblies may be individually cleaned by immersion baths, and may be quickly reassembled for subsequent use.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A divider head assembly for detachable mounting to a dividing and rounding machine, comprising
   (a) a cover plate having an upper surface with means for attachment to said dividing and rounding machine, said cover plate having a central aperture therethrough, and having a plurality of further apertures therethrough; said cover plate having a lower surface;
   (b) a plug plate having an upper surface closely affixed against said cover plate lower surface, said plug plate having a central aperture therethrough and a plurality of further apertures therethrough, all respectively aligned with said cover plate central aperture and further apertures, and having a lower surface with means for attachment to a plurality of plugs;
   (c) a cutter blade holder having a neck sized to loosely fit through said two central apertures, said neck having means for attachment to said dividing and rounding machine above the upper surface of said cover plate; said cutter blade holder having a plurality of cutter blade mounting fasteners beneath the lower surface of said plug plate, each of said mounting fasteners being alignable with a respective one of said plurality of further apertures through said cover plate and said plug plate;
   (d) a cutter blade assembly detachably connected to said cutter blade holder by said plurality of mounting fasteners, said cutter blade assembly further comprising a geometric arrangement of blades, said blades being welded together along interconnecting edges to form a unitary assembly, wherein said mounting fasteners are accessed to remove said cutter blade assembly upon alignment of said fasteners and said plurality of further apertures; and (e) a plurality of plugs, each plug having a geometric shape to slidably fit between and within said geometric arrangement of blades, and each plug connected to said plug plate lower surface with means for attachment to plugs.

2. The apparatus of claim 1, wherein said cutter blade assembly further comprises a complete weldment along the edges of all blades which abut other blades, to thereby form a unitary construction having no openings between respective edge-abutted blades and said other blades along said weldments.

3. The apparatus of claim 2, wherein said cutter blade holder neck means for attachment to said dividing and rounding machine further comprises a key slot.

4. The apparatus of claim 3, further comprising at least two handles attached to said cover plate.

5. The apparatus of claim 2, wherein said cutter blade assembly is constructed from stainless steel materials.

6. The apparatus of claim 1, wherein said cutter blade assembly further comprises preselected blades having a threaded notch formed therein, said preselected blades being alignable with said cutter blade mounting fasteners, each of said threaded notches being sized to threadably accept one of the plurality of mounting fasteners for connecting said cutter blade assembly to said cutter blade holder.

* * * * *